United States Patent [19]

Overmann, III

[11] Patent Number: 5,034,025
[45] Date of Patent: Jul. 23, 1991

[54] MEMBRANE PROCESS FOR REMOVING WATER VAPOR FROM GAS

[75] Inventor: Dana C. Overmann, III, Lake Jackson, Tex.

[73] Assignee: The Dow Chemical Company, Midland, Mich.

[21] Appl. No.: 444,463

[22] Filed: Dec. 1, 1989

[51] Int. Cl.⁵ .......................................... B01D 53/22
[52] U.S. Cl. ............................................ 55/16; 55/66; 55/68; 55/70; 55/73
[58] Field of Search ...................... 55/16, 68, 158, 66, 55/70, 73

[56] References Cited

U.S. PATENT DOCUMENTS

| | | | |
|---|---|---|---|
| 1,496,757 | 6/1924 | Lewis et al. | 55/16 |
| 3,144,313 | 8/1964 | Pfefferle | 55/16 |
| 3,241,293 | 3/1966 | Pfefferle | 55/16 |
| 3,339,341 | 9/1967 | Maxwell et al. | 55/158 X |
| 3,442,002 | 6/1969 | Geary, Jr. et al. | 55/158 X |
| 3,564,819 | 2/1971 | Neulander et al. | 55/158 |
| 3,604,246 | 9/1971 | Toren | 55/16 X |
| 3,624,983 | 12/1971 | Ward, III | 55/16 |
| 3,735,558 | 5/1973 | Skarstrom et al. | 55/16 |
| 3,735,559 | 5/1973 | Salemme | 55/16 |
| 3,793,111 | 2/1974 | Judkins | 55/158 X |
| 3,797,202 | 3/1974 | Neulander et al. | 55/158 |
| 3,822,202 | 7/1974 | Hoehn | 55/16 |
| 4,276,058 | 6/1981 | Dinsmore | 55/180 X |
| 4,289,505 | 9/1981 | Hardison et al. | 55/180 X |
| 4,430,807 | 2/1984 | Davis et al. | 55/16 X |
| 4,497,640 | 2/1985 | Fournie et al. | 55/16 |
| 4,589,890 | 5/1986 | Gronvaldt | 55/180 X |
| 4,718,921 | 1/1988 | Makino et al. | 55/16 |
| 4,783,201 | 11/1988 | Rice et al. | 55/16 |
| 4,834,779 | 5/1989 | Paganessi et al. | 55/16 |
| 4,838,904 | 6/1989 | Sanders, Jr. et al. | 55/158 |
| 4,842,718 | 6/1989 | Luteijn et al. | 55/16 X |
| 4,844,719 | 7/1989 | Toyomoto et al. | 55/16 |

FOREIGN PATENT DOCUMENTS

| | | | |
|---|---|---|---|
| 3726431 | 2/1989 | Fed. Rep. of Germany | 55/158 |
| 2571270 | 4/1986 | France | 55/158 |
| 60-238120 | 11/1985 | Japan | 55/158 |
| 1329137 | 9/1973 | United Kingdom | |

Primary Examiner—Robert Spitzer
Attorney, Agent, or Firm—Janet Pauline Clark

[57] ABSTRACT

Disclosed is a process for removing water vapor from water vapor-containing gases which is carried out by contacting with a feed gas mixture containing water vapor one side of a semi-permeable membrane selective to the passage of water vapor, maintaining a water vapor partial pressure differential across the membrane under conditions such that water vapor selectively permeates through the membrane from the higher pressure side to the lower pressure side of the membrane, contacting the opposite and lower pressure side of the membrane with a dry condensable sweep gas, and collecting and condensing the sweep gas containing permeated water, thereby causing separation of the sweep gas containing permeated water into an organic liquid phase and aqueous liquid phase.

22 Claims, 2 Drawing Sheets

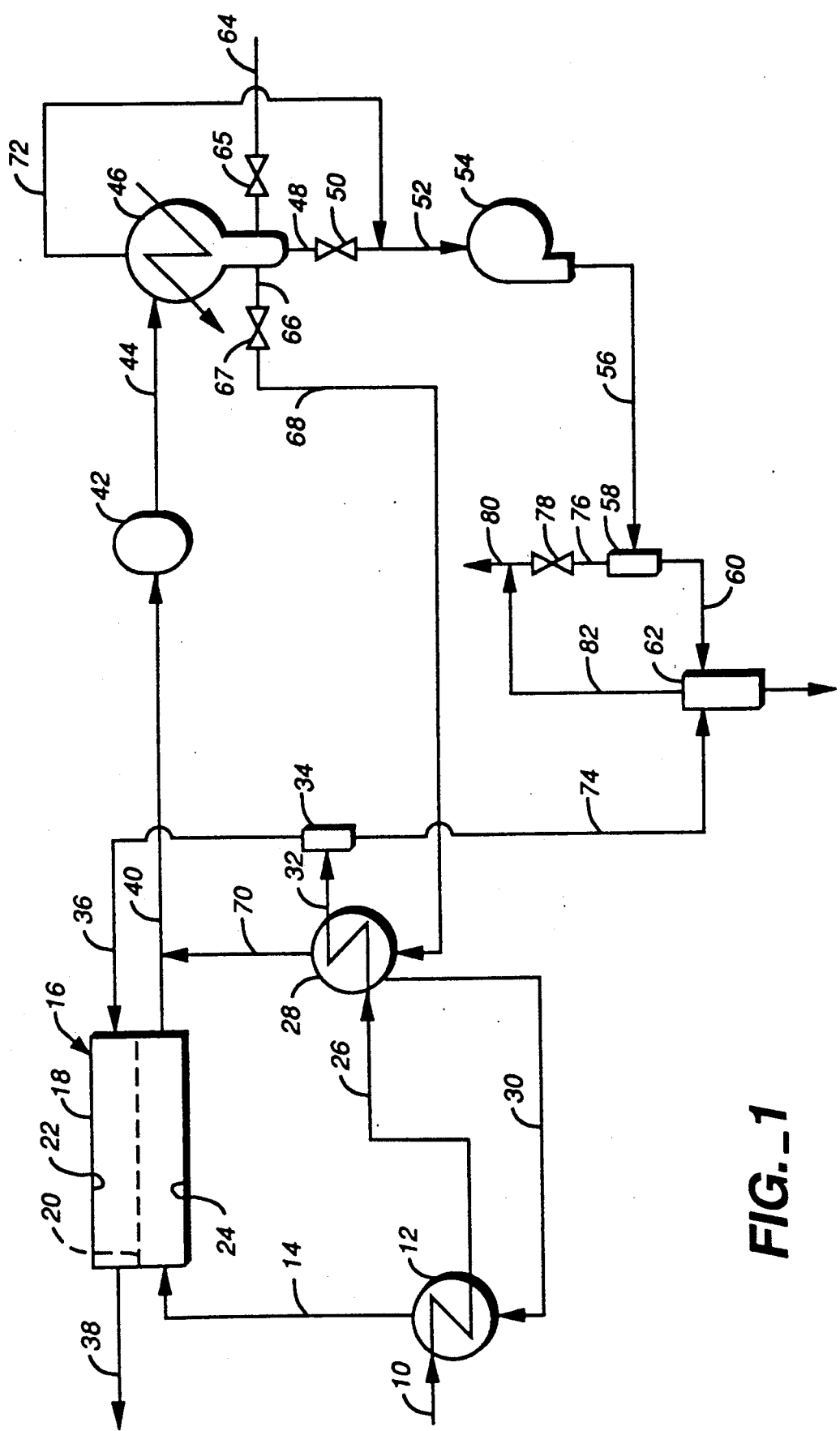
FIG._1

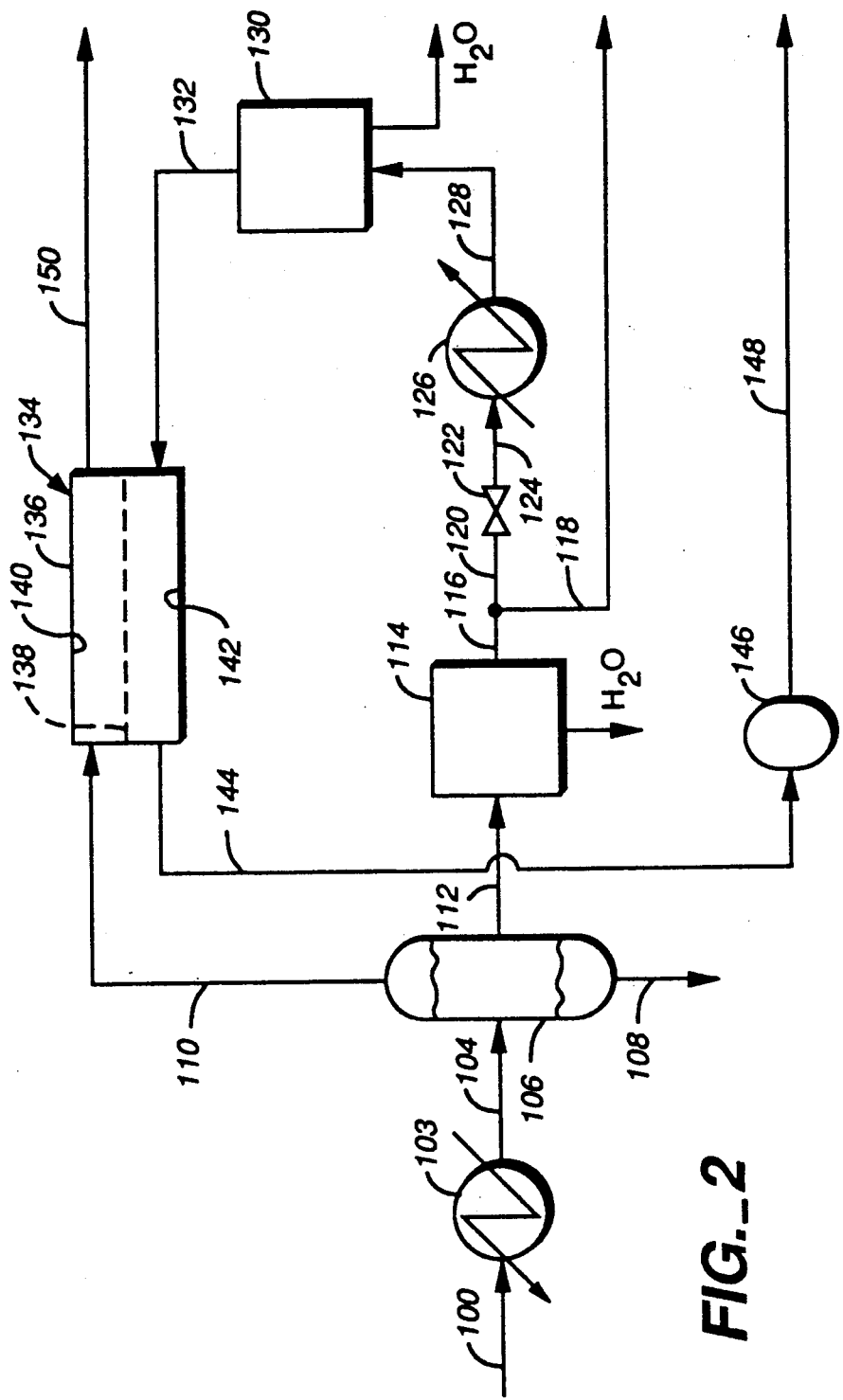
FIG._2

MEMBRANE PROCESS FOR REMOVING WATER VAPOR FROM GAS

BACKGROUND OF THE INVENTION

1. Field of the Invention

The present invention relates to a process for removing water vapor from water vapor-containing gas utilizing a semi-permeable membrane. More specifically, it relates to a process for removing water vapor from water vapor-containing gas by flowing a dry condensable sweep gas on the downstream side of a semi-permeable membrane while flowing water vapor-containing gas on the upstream side of the membrane. Water vapor permeates from the upstream to the downstream side of the membrane. The condensable sweep gas containing water vapor is collected and condensed into an organic phase and an aqueous phase, which are then separated.

Many natural gases contain a significant amount of water vapor when the gases are produced from wells. It is well known that methane, ethane, and other hydrocarbons as well as carbon dioxide will form hydrates, solid ice-like materials, when conditions are such that liquid water is in contact with high pressure natural gas streams. Such hydrate formation can plug natural gas pipelines, preventing flow. Also, if liquids condense from the gas phase which contain water, significant corrosion of the pipeline material can occur. This is particularly so where carbon dioxide is also present in the gas stream. In addition to these problems, the formation of liquids in a pipeline can cause collection of these liquids in low points in the line which can cause slugging or unsteady flow which is also undesirable. It is therefore desirable to have a means for removing the water vapor from natural gas at the well site, and on off-shore wells, on the platform itself.

Air, oxygen, and nitrogen used in industrial processes often contain excessive amounts of water vapor which may have a detrimental impact on the processes being carried out. Thus it is desirable to have an effective and efficient means of removing water vapor from air, oxygen, nitrogen, and other industrial gases.

This invention is concerned with a compact, effective, efficient, and economical process for dehydrating gases. It is particularly useful for removing the water vapor from natural gas and/or removing water vapor from air.

2. The Prior Art

In the past, semi-permeable membranes have been used to recover or isolate a variety of gases, including hydrogen, helium, oxygen, nitrogen, water vapor, carbon dioxide, methane, and light hydrocarbons. Particular applications have included the use of membranes to dehydrate natural gas and air.

Several processes have been described in the prior art for removing water vapor from water vapor-containing gas. See for example U.S. Pat. Nos. 3,735,558; 3,822,202; 4,378,400; and 4,440,643.

A process for removing water vapor from water vapor-containing gas is also described in U.S. Pat. No. 4,718,921. In this patent, it is disclosed that water vapor-containing gas can be separated into a fraction having an increased content of water vapor and a remaining fraction having a decreased content of water vapor by a gas separating device which has at least one gas separating membrane having gas feed and delivery surfaces, in such a manner that (1) a water vapor-containing feed gas is fed to a feed side of the gas separating device: (2) the feed gas is flowed along the gas feed surface of the gas separating membrane to allow a fraction of the feed gas to permeate through the gas separating membrane: (3) a drying gas containing 300 ppm or less of water vapor is fed to a delivery side of the gas separating device: (4) the fed drying gas is flowed along the delivery surface of the gas separating membrane to promote the permeation of water vapor through the gas separating membrane: (5) the permeated gas fraction is collected together with the flowing drying gas at the delivery side of the gas separating device and (6) the remaining gas fraction not permeated through the gas separating membrane and having a decreased content of water vapor is recovered from the feed side of the gas separating device. The preferred drying or sweep gas disclosed in the patent is argon, although other gases such as nitrogen and neon gases are said to be suitable for use. A gas separating device for accomplishing these purposes is described in FIG. 1 and 2 of the patent.

U.S. Pat. No. 4,844,719 discloses a method for the desiccation of a water-containing gas which comprises bringing the gas into contact with one side of a membrane formed of a fluorine type copolymer containing specific repeating units, and either bringing a dry purge gas into contact with the other side of the membrane or reducing the pressure on the other side of the membrane, thereby removing water from the water-containing gas. The dry purge gas used in the process can be any one of a number of gases, including hydrogen, helium, and argon.

Other commonly used sweep gases, or purge gases as they are sometimes referred to, include air, carbon dioxide, and nitrogen.

It would be desirable in the art to provide a process for recovery of water vapor from water vapor-containing gases using a sweep gas which is inexpensive, easily condensed, possesses low water solubility in the condensed phase, and can be easily recycled if desired. This invention is concerned with such a process.

SUMMARY OF THE INVENTION

It is an object of the present invention to provide a process for removing water vapor from a water vapor-containing feed gas which is compact, effective, efficient, and economical.

It is another object of the present invention to provide an efficient and economical process for removing water vapor from a water vapor-containing feed gas which uses recyclable materials and is therefore adaptable for use on an off-shore drilling platform or in remote land based locations.

The foregoing and other objects of the invention are obtained by the process described herein.

That process is one for removing water vapor from water vapor-containing gases comprising the steps of:

A. contacting with a feed gas mixture comprising at least one gas and water vapor the higher pressure side of a semi-permeable membrane having a higher pressure side and a lower pressure side, wherein said semi-permeable membrane is selectively permeable to water vapor;

B. maintaining a water vapor partial pressure differential across said membrane under conditions such that water vapor selectively permeates through said membrane from said higher pressure side to said lower pressure side of the membrane;

C. contacting said lower pressure side of said membrane with a substantially dry organic condensable sweep gas, at a sufficient volumetric flowrate relative to said feed gas mixture, whereby water vapor in said feed gas mixture selectively permeates through said membrane and into said sweep gas:

D. collecting and condensing the condensable organic sweep gas containing the permeated water vapor, thereby causing separation of the condensable sweep containing the permeated water vapor gas into an organic liquid phase and an aqueous liquid phase: optionally, E. separating the aqueous liquid phase and organic liquid phase: and optionally, F. vaporizing and optionally drying said organic liquid phase for reuse, or drying said organic liquid phase and vaporizing it for reuse.

BRIEF DESCRIPTION OF DRAWINGS

FIG. 1 is a schematic flow diagram illustrating one embodiment of the invention.

FIG. 2 is a schematic flow diagram illustrating an alternative embodiment of the invention.

DETAILED DESCRIPTION OF THE INVENTION

The process of this invention utilizes membranes which preferably possess high water vapor permeability and selectivity to separate water vapor from gases such as air and natural gas. The membranes also preferably possess good mechanical properties and good temperature and chemical resistance.

In general, any membrane can be used in the process of this invention which selectively permeates water vapor compared with the gas being dehydrated.

To separate a gas mixture into two portions, one richer and one leaner in at least one gaseous component, a gas mixture is conventionally brought into contact with one side of a semi-permeable membrane through which at least one of the gaseous component(s) selectively permeates. A gaseous component which selectively permeates through the membrane passes through the membrane more rapidly than the other gaseous component(s) of the mixture. The gas mixture is thereby separated into a stream which is enriched in the selectively permeating gaseous component(s) and a stream which is depleted in the selectively permeating gaseous component(s). The stream which is depleted in the selectively permeating gaseous component(s) is by the nature of the process enriched in the relatively non-permeating gaseous component(s). An appropriate membrane material is chosen for the mixture at hand so that the desired degree of separation of the gas mixture can be achieved.

Preferred membrane materials for the dehydration membranes useful in this invention include cellulosic polymers, polyamides, polyaramides, polyimides, polycarbonates and polyestercarbonates, polysulfones and polyethersulfones, polyureas and derivatives thereof, perfluorosulfonic acid polymers and derivatives thereof, polysaccharides, polyvinyl alcohols, sulfonated polyolefins, sulfonated polystyrenes, polysiloxanes, and the like. More preferred membrane materials include cellulosic polymers, polyimides, polyureas and derivatives thereof, polysulfones and polyethersulfones, and perfluorosulfonic acid polymers and derivatives thereof.

Even more preferred membrane materials include cellulosic polymers, polyureas and derivatives thereof, perfluorosulfonic acid polymers and derivatives thereof, and polyimides.

Preferred cellulosic polymers include cellulose ethers and esters. Preferred cellulosic polymers include regenerated cellulose, ethyl cellulose, cellulose acetate, cellulose diacetate, cellulose triacetate, cellulose butyrate, cellulose propionate, and the like. More preferred cellulosic polymers include cellulose acetate, cellulose diacetate, cellulose triacetate, and mixed esters and blends thereof. Membranes from such cellulosic polymers are known in the art. See U.S. Pat. Nos. 3,423,491; 3,494,780; 3,532,527; and 4,430,807; the relevant portions thereof incorporated by reference for all legal purposes served thereby.

Preferred membranes include polycarbonate membranes, such as those membranes described in U.S. Pat. No. 4,772,392, perfluorosulfonic acid membranes, such as those membranes described in U.S. Pat. Nos. 4,741,744 and 4,666,468, and polyimide membranes, such as those membranes described in U.S. Pat. Nos. 3,822,202; 4,378,400; 4,690,873; 4,705,540; and 4,717,393; the relevant portions thereof incorporated by reference for all legal purposes served thereby.

The membranes may be homogeneous, asymmetric, or composite membranes. In the case of hollow fiber asymmetric membranes, the membranes may have the discriminating region either on the outside of the hollow fiber or at the lumen surface of the hollow fiber. The membranes may also possess a dense discriminating region located somewhere internal to the surfaces of the membrane. In that embodiment where the discriminating region of the membrane is internal to the membrane surfaces, the inside surface and the outside surface of the membrane are porous, yet the membrane demonstrates the ability to separate gases.

Membranes for the separation of gases may take several forms. Membranes may be in the form of hollow fibers, tubules, or flat sheets fabricated respectively into hollow fiber, tubular, or plate and frame and spiral wound devices. The fabrication of such membranes and devices may be made by methods known in the art. See, for example, U.S. Pat. Nos. 3,228,876; 3,422,008; 3,455,460; 3,475,331; 3,526,001; 3,528,553; 3,690,465; 3,702,658; 3,755,034; 3,801,401; 4,271,900; 3,872,014; 3,966,616; 4,045,851; 4,061,574; 4,080,296; 4,083,780; 4,220,535; 4,235,723; 4,265,763; 4,315,819; 4,430,219; 4,351,092; 4,367,139; and U.S. patent applications Ser. No. 309,756, filed Feb. 9, 1989, now U.S. Pat. No. 4,929,259, and Ser. No. 429,928, filed Oct. 30, 1989, now U.S. Pat. No. 4,961,760; the relevant portions of which are incorporated by reference for all legal purposes served thereby.

Such membranes and devices are used to isolate or recover gases from gas mixtures, and in this particular instance, water vapor from a feed gas mixture comprising at least one gas in addition to water vapor. The feed gas mixture contains water vapor, and at least one other gas such as air, hydrogen, helium, argon, oxygen, nitrogen, carbon monoxide, carbon dioxide, natural gas, light hydrocarbons, ammonia, hydrogen sulfide, and the like. Light hydrocarbons as used herein means $C_{1-4}$ saturated and unsaturated gaseous hydrocarbons. The membrane is saturated with the feed gas mixture on the higher pressure side of the membrane, while a water vapor partial pressure differential is maintained across the membrane by contacting the lower pressure side of the membrane with a substantial dry organic condensable sweep gas. The water vapor in the feed gas mixture selectively permeates through the membrane to the lower pressure side of the membrane. A permeate stream is thus obtained on the lower pressure side of the membrane which comprises the condensable sweep gas which is enriched in the permeated water vapor. The sweep gas containing the permeated water vapor is removed from the lower pressure (downstream) side of the membrane. The non-permeate stream depleted in the water vapor is withdrawn from the higher pressure (upstream) side of the membrane.

In separating water vapor from a feed gas mixture, the driving force for transport which drives the water vapor selectively across and through the membrane is the water vapor partial pressure differential between the feed side of the membrane, i.e., the higher pressure side, and the permeate side of the membrane, i.e., the lower pressure side. Feed or higher pressure side of the membrane refers herein to that side of the membrane to which the feed gas mixture from which the water vapor is to be separated is contacted. Permeate or lower pressure side of the membrane is that side of the membrane to which the water vapor permeates. The condensable sweep gas must therefore be substantially dry relative to the feed gas mixture so that the water vapor partial pressure differential is such that permeation of water vapor through and across the membrane occurs at a reasonable rate.

The feed gas mixture can be any gas or gases containing a volume of water vapor which it is desired to remove. Preferably, the feed gas is air or natural gas. Natural gas contains a high percentage of methane, along with other light hydrocarbons. In carrying out the process of the present invention, the water vapor-containing feed gas preferably contains water vapor in an amount corresponding to about 25 percent to about 100 percent of the saturated water vapor content in the feed gas mixture at the temperature and pressure of the feed gas mixture.

As used herein, condensable sweep gas refers to that fluid, which when vaporized, is used on the lower pressure side of the semi-permeable membrane to sweep away the permeated water vapor. The sweep gas is substantially dry. Any condensable organic fluid possessing a relatively low permeability through the membrane may be used as the sweep gas, when vaporized. The condensable organic fluid should vaporize below the normal membrane operating temperature and sweep gas pressure. The condensable organic fluid preferably possesses a low water solubility therein in order to be effective. Preferably, the solubility of water in the condensed sweep fluid is less than about 0.5 mole percent, more preferably less than about 0.1 mole percent.

Preferred condensable organic sweep gases for use in the process of the invention include at least one $C_{2-8}$ hydrocarbon. More preferred condensable sweep gases include n-butane, iso-butane, pentane, hexane, or a mixture thereof. The sweep gas may also comprise chlorinated hydrocarbons, chlorofluorocarbons, or aromatic hydrocarbons, so long as such gases are compatible with the membrane material, do not substantially permeate through the membrane, and possess low water solubility. Some of the condensable organic fluids are liquids at normal temperatures and atmospheric pressure. However, they can be vaporized by heating, or by pressure reduction. The temperature of the feed gas to the membrane should be at or above the vaporization temperature of the condensable organic fluid at the sweep gas pressure to prevent condensing the sweep gas inside the membrane device.

By using a vaporized condensable organic fluid which possesses low water solubility therein as the sweep gas, loss of feed and/or product gas can be significantly reduced. In natural gas, there is frequently a condensable fraction of higher molecular weight hydrocarbons such as ethane, propane, butane, pentanes, and the like, which possess low water solubility therein; thus such condensable fraction may serve as the sweep gas required for the dehydration process This is particularly advantageous when using the process on off shore oil and gas well platforms. When this condensable fraction is used as the sweep gas, transportation costs of carrying major quantities of sweep gas from land based storage facilities are eliminated.

The process should be carried out at pressures and temperatures which do not deleteriously affect the membrane. Preferably, the pressure differential across the membrane is between about 5 and about 2,000 psig, more preferably between about 50 and about 1,500 psig, even more preferably between about 100 to about 1,200 psig, depending upon the gas being dehydrated. The process preferably takes place at temperatures between about 0° to about 150° C., more preferably from about 0° to about 125° C., and even more preferably from about 0° to about 100° C., depending on the gas being dehydrated.

In the process of the present invention, the efficiency of the removal of water from the water vapor-containing feed gas can be widely controlled by controlling the pressure of the feed gas mixture, the feed rate of the drying gas, and the flow rate and pressure of the sweep gas.

Gas permeability is defined as:

$$P = \frac{(\text{amount of permeant}) (\text{membrane thickness})}{(\text{area}) (\text{time}) (\text{driving force across the membrane})}.$$

A standard permeability measurement unit is:

$$\frac{(\text{centimeter}^3 \text{ (STP)}) (\text{centimeter})}{(\text{centimeter}^2) (\text{second}) (\text{centimeter Hg})},$$

abbreviated hereinafter as:

$$\frac{cm^3 \text{ (STP) cm}}{cm^2 \text{ s cm-Hg}}.$$

Another way of measuring the rate of the separation of the water vapor from the feed gas is to measure the flux. Flux is defined as the permeability of the gas divided by the thickness of the membrane through which it passes, or alternatively, the rate of gas permeation per unit surface area per unit driving force. A standard flux measurement unit is:

$$\frac{(\text{centimeter}^3 \text{ (STP)})}{(\text{centimeter}^2) (\text{second}) (\text{centimeter Hg})},$$

abbreviated hereinafter as:

$$\frac{cm^3 \text{ (STP)}}{cm^2 \text{ s cm-Hg}}.$$

The separation factor (selectivity) is defined as the ratio of the permeability of the faster permeating gas to the permeability of the slower permeating gas.

The membrane used in the process of this invention preferably has a water vapor permeability of at least about $$1 \times 10^{-8} \frac{cm^3 \text{ (STP) cm}}{cm^2 \text{ s cm-Hg}},$$

more preferably at least about $$1 \times 10^{-7} \frac{cm^3 \text{ (STP) cm}}{cm^2 \text{ s cm-Hg}}.$$

The membrane used in the process of this invention preferably has a separation factor for water vapor/methane of at least about 500, more preferably of at least about 1,000.

In carrying out the process of the invention, the feed gas mixture is introduced into an inlet port of the semi-permeable membrane device. The feed gas mixture is transported from the feed gas mixture inlet port of the membrane device, along and in contact with, one side of the semi-permeable membrane, and out a non-permeate exit port of the membrane device.

Simultaneously, the sweep gas is introduced through another port in the semi-permeable membrane device, onto the opposite side of the membrane from the feed gas mixture. The sweep gas can be introduced into the membrane device in such a manner that it flows in relation to the feed gas mixture in a co-current direction, in a cross- or radial-direction, or in a counter-current direction. Preferably, the sweep gas is introduced into the membrane device in such a manner that it flows in a counter-current direction relative to the feed gas mixture.

Water vapor from the feed gas mixture permeates through the semi-permeable membrane and is picked up and transported away by the sweep gas. The sweep gas containing permeated water vapor is then drawn off through an exit port of the semi-permeable membrane device and subsequently condensed. Upon condensing, preferably by cooling, the sweep gas, now containing substantially more water vapor than when it was introduced into the semi-permeable membrane device, separates into an organic liquid phase and an aqueous liquid phase. The aqueous liquid phase is drawn off, and the organic liquid phase is optionally dried, then vaporized and recycled through the semi-permeable membrane device. Or, the organic liquid phase can be vaporized, then dried, and then recycled through the membrane device or processed by other equipment.

FIGS. 1 and 2 illustrate two alternative embodiments of the invention. FIG. 1 represents what may be designated a recycle system, using a condensable organic fluid from an outside source, while FIG. 2 illustrates an embodiment where a portion of the original feed gas is used as the sweep gas.

Referring to FIG. 1, a feed gas mixture containing water vapor is introduced through line 10, into a heat exchanger 12. In the heat exchanger 12, the feed gas is cooled while the sweep fluid is vaporized. The vaporized condensable organic fluid, now a gas, is transported from the heat exchanger 12 through line 14 and is introduced into a membrane device 16. The membrane device 16 comprises a shell 18 with a membrane 20 positioned inside, separating the device into a higher pressure side 22 and a lower pressure side 24. The vaporized sweep gas is introduced through line 14 into the lower pressure side 24 of the membrane device 16. The cooled feed gas mixture, containing relatively non-volatile fractions and water vapor is conducted from the heat exchanger 12 through line 26 to a second heat exchanger 28, where additional heat is removed and water is vaporized from the sweep fluid. The cooled feed gas and non-volatile fractions are then transported through line 32, to a liquid trap 34. In the liquid trap 34, liquid is removed, and the feed gas mixture is then transported through line 36 to the higher pressure side 22 of the membrane device 16. In the higher pressure side 22 of the membrane device 16, water vapor permeates through the membrane 20 into the lower pressure side 24 of the membrane device 16, where it is picked up and transported away by the sweep gas being introduced through line 14. The non-permeated portion of the feed gas mixture is then removed from the membrane device 16 through line 38.

In FIG. 1, after the sweep gas containing permeated water vapor exits the membrane device 16, it is transported through line 40 to a blower or compressor 42, and from the blower or compressor 42 through line 44 to a condenser/decanter 46. In the condenser/decanter 46, the sweep gas containing water vapor is condensed, and the resulting liquid is separated into an aqueous liquid phase and an organic liquid phase. The aqueous liquid phase is removed from the bottom portion of the condenser/decanter 46, being transported through line 48, valve 50, and line 52 to pump 54, and from pump 54 through line 56 to a separator 58, through line 60 to a receptacle 62 for the aqueous liquid phase. Note in some applications, the aqueous liquid phase will be lighter than the organic liquid phase and the aqueous liquid phase will then be withdrawn from the top of the condenser/decanter.

In FIG. 1, condensable organic sweep fluid is introduced into the system through line 64 as needed to maintain the desired amount in the system. The condensable organic fluid passes through valve 65 and through condenser/decanter 46, where it is joined by relatively less volatile fractions of the sweep gas (now a fluid) separated in the condenser/decanter 46. The fluid mixture then passes via line 66 through valve 67 and line 68 to the heat exchanger 28, where water vapor and relatively more volatile components are removed through line 70 and joined with line 40 through which the sweep gas is transported after it has been removed from the lower pressure side 24 of the membrane device 16. The at least partially dried condensable organic fluid is then transported through line 30 to the heat exchanger 12 where it is vaporized, as previously described.

In FIG. 1, water vapor and other non-condensable components exit from the condenser/decanter 46 through line 72 and are joined with line 52 downstream of valve 50. Water from the liquid trap 34 is transported through line 74 to the water receiver 62 and ultimately disposed of. Residual water vapor and other non-condensable components are vented from the trap 58 through line 76, valve 78, and line 80 to the atmosphere. Line 82, connected to the water receptacle 62 and joining line 80 downstream from valve 78, conducts additional water vapor and non-condensable components to the atmosphere.

Thus is described a completely self contained process which uses a recyclable fluid as a sweep gas.

FIG. 2 illustrates an alternative embodiment of the invention wherein a feed gas mixture is introduced through line 100 to a heat exchanger 102, where it is partially condensed prior to passing through line 104 to a three-phase separator 106. In the three-phase separator 106, water is drawn off from the bottom through line 108, the feed gas mixture is drawn off from the top through line 110, and a condensable organic fluid fraction is drawn off as a liquid through line 112 to an optional dryer 114, where additional water is removed. From the dryer 114, the condensable organic fluid is passed into line 116. Excess condensate is bled off from line 116 through line 118 which connects with line 116.

In FIG. 2, the balance of the condensable organic fluid is passed from line 116, through line 120, pressure reducing valve 122, and line 124 to a vaporizer 126, which vaporizes the condensable organic fluid to a gas to serve as the sweep gas. From the vaporizer 126, the sweep gas is passed through line 128 to an optional gas dryer 130, where additional water is removed, and from there through line 132 to a membrane device 134. The membrane device 134 comprises a shell 136 and a membrane 138 which divides the device into a side 140 of higher pressure and a side 142 of lower pressure. After passing through the lower pressure side 142 of the membrane device 134, and contacting the lower pressure side 142 of the membrane 138, picking up water vapor, the sweep gas containing permeated water vapor is then passed through line 144 to an optional compressor 146 which is used to pressurize the wet sweep gas and/or is conducted through line 148 to further process equipment or disposal.

In FIG. 2, the feed gas mixture fraction being passed through line 110 is introduced into the higher pressure side 140 of the membrane device 134, wherein water vapor diffuses through the membrane 138 into the lower pressure side 142. The water vapor depleted non-permeate feed gas mixture is then transported from the membrane device 134 through line 150 for further processing or use.

It will be understood by those skilled in the art that various modifications in the process described herein may be made without departing from the scope of the claims.

What is claimed is:

1. A membrane process for removing water vapor from water vapor-containing gases, which process comprises:
    A. contacting with a feed gas mixture comprising at least one gas and water vapor, the higher pressure side of a semi-permeable membrane itself comprising at least one organic polymer having a higher pressure side and lower pressure side, wherein said semi-permeable membrane is selectively permeable to water vapor;
    B. maintaining a water vapor partial pressure differential across said semi-permeable membrane under conditions such that water vapor selectively permeates through said semi-permeable membrane from said higher pressure side to said lower pressure side of said semi-permeable membrane;
    C. contacting said lower pressure side of said semi-permeable membrane with a substantially dry organic condensable sweep gas which has a different fluid composition by weight as compared to the wet feed gas mixture, at a sufficient volumetric flow rate relative to said feed gas mixture, whereby water vapor in said wet feed gas mixture selectively permeates through said semi-permeable membrane and into said sweep gas thereby producing a treated non-permeated gas stream and a separate permeated water vapor and condensable organic sweep gas stream;
    D. collecting and condensing said condensable organic sweep gas and permeated water vapor stream, thereby causing separation of the organic condensable sweep gas containing the permeate water vapor into an organic liquid phase and an aqueous liquid phase; and
    D'. withdrawing the treated non-permeate gas stream from the higher pressure side of the semipermeable membrane, which non-permeate gas stream is depleted in water vapor content as compared to the feed gas mixture.

2. The process of claim 1 comprising the further step of:
    E. separating said aqueous liquid phase and organic liquid phase.

3. The process of claim 2 which comprises the further step of:
    F. vaporizing said organic liquid phase for reuse.

4. The process of claim 3 comprising the further step of:
    G. drying said vaporized organic liquid phase.

5. The process of claim 2 comprising the further step of:
    F. drying said organic liquid phase and vaporizing said organic liquid phase for reuse.

6. The process of claim 2 wherein said semi-permeable membrane is fabricated from a polymer selected from the group consisting of cellulosic polymers, polyamides, polyaramides, polyimides, polycarbonates, polyestercarbonates, polysulfones, polyethersulfones, polyureas and derivatives thereof, polysaccharides, polyvinyl alcohols, sulfonated polyolefins, sulfonated polystyrenes, polysiloxanes, and perfluorosulfonic acid polymers and derivatives thereof.

7. The process of claim 6 wherein the semi-permeable membrane is fabricated from a polymer selected from the group consisting of cellulosic polymers, polyureas and derivatives thereof, perfluorosulfonic acid polymers and derivatives thereof, and polyimides.

8. The process of claim 6 wherein the cellulosic polymer is selected from the group consisting of cellulose acetate, cellulose diacetate, cellulose triacetate, and mixed esters and blends thereof.

9. The process of claim 2 wherein the feed gas mixture contains at least one of the gases selected from the group consisting of air, hydrogen, helium, argon, oxygen, nitrogen, carbon monoxide, carbon dioxide, natural gas, light hydrocarbons, ammonia, and hydrogen sulfide.

10. The process of claim 9 wherein said feed gas mixture comprises natural gas.

11. The process of claim 9 wherein said feed gas mixture comprises air.

12. The process of claim 2 wherein said sweep gas comprises at least one gas selected from the group consisting of vaporized $C_2$–$C_8$ hydrocarbons, chlorinated hydrocarbons, chlorofluorocarbons, and aromatic hydrocarbons.

13. The process of claim 12 wherein the sweep gas comprises at least one $C_{2-8}$ hydrocarbon selected from the group consisting of n-butane, iso-butane, pentane, and hexane.

14. The process of claim 13 wherein the sweep gas is n-butane.

15. The process of claim 2 wherein the water vapor permeability of the membrane is at least about $$1 \times 10^{-8} \frac{cm^3 \text{ (STP) cm}}{cm^3 \text{ s cm-Hg}}.$$

16. The process of claim 15 wherein the semi-permeable membrane has separation factor for water vapor/methane of at least about 500.

17. The process of claim 2 wherein the pressure differential between the high pressure side and the low pressure side of said membrane is between about 5 and about 2,000 psig.

18. The process of claim 2 wherein the temperature is between about 0° and about 150° C.

19. The process of claim 2 wherein said condensing is achieved by cooling of said condensable organic sweep gas containing permeated water.

20. The process of claim 2 wherein said condensing is achieved by pressurizing of said condensable organic sweep gas containing permeated water.

21. The process of claim 1 wherein the sufficient volumetric flowrate of the substantially dry organic condensable sweep gas comprises an equal or greater volumetric flowrate relative to the feed gas mixture.

22. The process of claim 1 wherein in step C the substantially dry organic condensable sweep gas is obtained as a substantially dry gas from said wet feed gas mixture by removal of water from a portion of the water-containing feed gas mixture prior to contacting the water-containing feed gas mixture with the semi-permeable membrane, said removal of water vapor from the wet feed gas mixture occurring by condensing a portion said feed gas mixture comprising an organic condensable gas and water vapor to produce an organic liquid phase and an aqueous liquid phase, separating and vaporizing the liquid organic phase to produce a substantially dry organic condensable sweep gas.

* * * * *